Sept. 18, 1934.  C. W. MARSH  1,974,362
PISTON
Filed June 1, 1931  4 Sheets-Sheet 1

Sept. 18, 1934.  C. W. MARSH  1,974,362

PISTON

Filed June 1, 1931   4 Sheets-Sheet 2

Sept. 18, 1934. C. W. MARSH 1,974,362
PISTON
Filed June 1, 1931 4 Sheets-Sheet 3

Inventor:
Charles W. Marsh
By Williams, Bradbury,
McCaleb & Hinkle
Attys.

Sept. 18, 1934.  C. W. MARSH  1,974,362
PISTON
Filed June 1, 1931  4 Sheets-Sheet 4
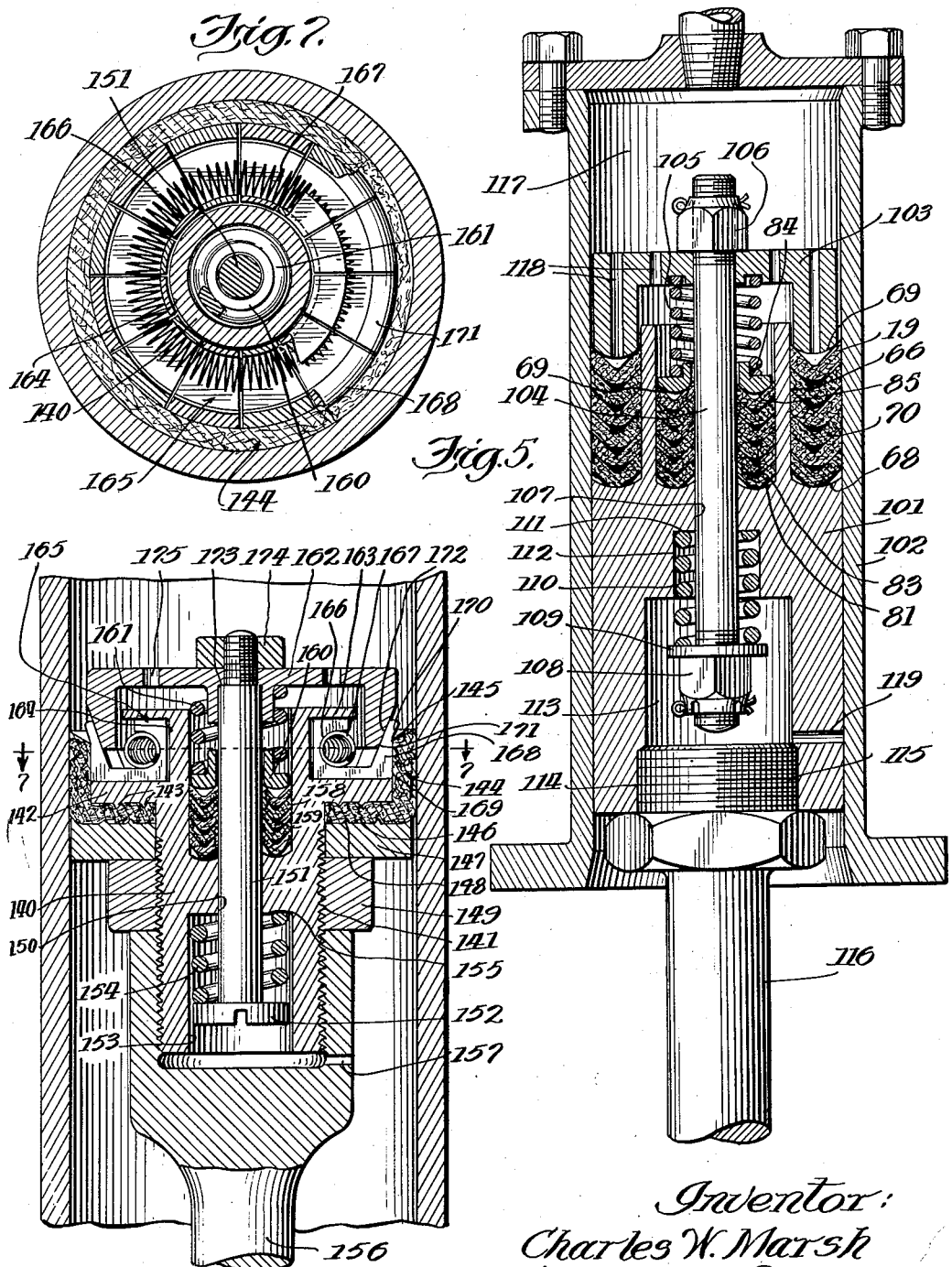

Patented Sept. 18, 1934

1,974,362

UNITED STATES PATENT OFFICE 1,974,362

PISTON

Charles W. Marsh, Muskegon, Mich.

Application June 1, 1931, Serial No. 541,301

8 Claims. (Cl. 309—34)

The present invention relates to pistons, and is particularly concerned with pistons of the type adapted to be employed in a cylinder for use in pumps, air compressors, hydraulic rams, air hoists, air chucks, railway air brakes, automobile brakes, door checks and myriad other uses.

One of the objects of the invention is the provision of an improved cylinder and piston arrangement in which the piston is adapted to run idle without excessive tension or wear on the packing devices employed with the piston.

Another object is the provision of an improved piston in which the expansion of the packing devices is controlled and regulated by the amount of fluid pressure acting upon the piston, so that compensation is made for the increased tendency to leak past the packings under high pressure.

Another object is the provision of a piston of the class described, in which all of the moving parts are suitably arranged to prevent leakage of any kind past the pistons under low pressures or high pressures, and which is adapted to maintain a constant pressure without substantial leakage, for long periods of time.

Another object is the provision of a piston of the class described, which may be constructed either as a single acting or double acting piston, and which is adapted to prevent the building up of a pressure behind the packings, such as might tend to offset the compensating action of the high fluid pressure in the cylinder.

Another object is the provision of an improved piston of the class described, which is capable of long and continuous service without necessity for repacking.

Another object is the provision of a high pressure packing which is particularly adapted to be used in hydraulic machinery under extremely high pressures, and which will operate efficiently under such pressures for an extremely long life.

Another object is the provision of a plurality of forms of improved packing of substantially V shape, each of which is adapted to expand by virture of its shape and by virtue of the expanding devices, so that the packing is fed edgewise against the moving parts of the cylinder or piston to provide a fluid-tight joint which has an extremely wide range of adjustment and compensation to take up the wear, thereby giving the packing a longer life.

Another object is the provision of a plurality of modified forms of the invention, each of which has special advantages due to the particular construction and arrangement of the modification.

Other objects and advantages of the invention will be apparent from the following description and from the accompanying drawings, in which similar characters of reference indicate similar parts throughout the several views.

Referring to the drawings, of which there are four sheets;

Fig. 4 is a view similar to Fig. 1, of a modified form of piston intended for use as a hydraulic ram or pump plunger;

Fig. 5 is a similar view of another modified form of piston;

Fig. 6 is a similar view of another modification;

Fig. 7 is a transverse sectional view taken on the plane of the line 7—7 of Fig. 6 looking in the direction of the arrows;

Figure 8:
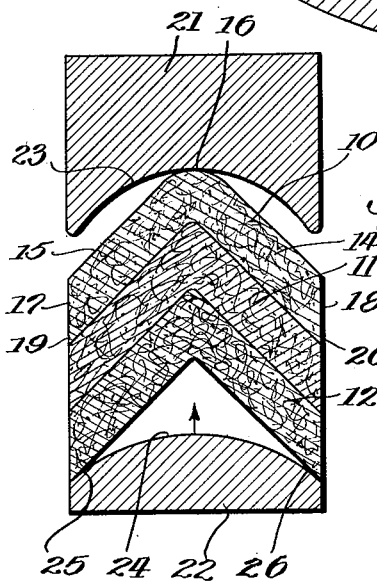
Fig. 8 is a diagrammatic cross-sectional view taken through one of the packings and expanders employed in the present pistons, showing a multiplicity of packings.
Figure 9:
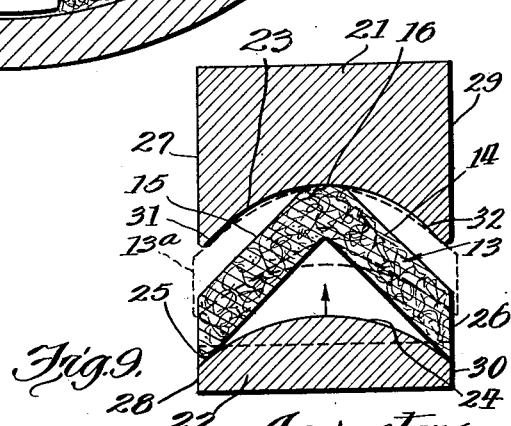
Fig. 9 is a view similar to Fig. 8, for illustrating the action which takes place in each packing between the expanding devices.

Referring to Figs. 8 and 9, the packings which are utilized in the present improved pistons, preferably consist of closed rings or molded leather members having a substantially V-shaped cross-section as shown at 10—13 in Figs. 8 and 9. The closed leather rings are preferred for the reason that there is less possibility of leakage than where a split ring is employed, but in some instances where it is impossible to assemble a closed leather ring with the piston, a split ring may be employed and the successive packing rings 10—12 are then arranged with the cuts staggered, that is, the cut of the ring 10 would be located over one of the uncut portions of the ring 11.

The packings may also consist of V-shaped members as shown in Fig. 8, arranged in the form of a spiral, of which the packings 10, 11 and 12 constitute separate turns, and the spiral form of packing has many advantages since the spiral may be expanded or contracted, and the same packing made to fit pistons or other members of different diameter. The spiral V-shaped packing is thus adapted to fulfill many different needs without the necessity for carrying in stock, rings of many different diameters.

Referring to Fig. 8, the packing rings 10—13 are each preferably provided with a pair of frusto-conical flanges 14 and 15 joined at the apex 16 forming a packing of substantially V-shape, and the edges 17 and 18 of the packing rings are preferably beveled to form substantially sharp points or lips 19 and 20. When a number of turns of spiral V-shaped packing are employed, each turn of the packing nests in the next adjacent turn and the same arrangement is present when a plurality of closed or split rings are employed, and Fig. 8 represents a section of packing of either kind.

The packings are preferably actuated by a pair of expansion members 21 and 22, the expansion member 21 preferably comprising a metallic ring which is adapted to fit about the piston and which is provided with a concave surface 23 for engaging the apex 16 of the packing 10—13. The concave annular groove 23 is of less depth than the altitude of the V-shaped section of the ring so that the expansion member 21 initially engages the apex 16 of the packing 10 and through the inter-engagement of the successive layers of packing is adapted to force the apices of all of the packing rings downward in Fig. 8.

The expansion member 22 is provided with a convex packing engaging surface 24 which is of less height than the altitude of the V section of one of the packing rings, so that the convex surface of the metal expansion ring 22 initially engages the lower inside edges 24 and 26 of the lowest packing ring 12. Through the inter-engagement of the packing ring 12 with the other nesting packing rings 10 and 11, the lower expansion member 22 is adapted to force the outer edges of the packing rings 10—12 upward in Fig. 8.

Referring to Fig. 9, this is a diagrammatic illustration of the expanding action of the members 21 and 22 when applied to a single packing ring 13, the action being substantially the same whether one ring or a plurality are employed. The full line illustration of packing ring 13 shows the ring before pressure is applied to the expansion members 21 and 22, but as soon as pressure is applied, the apex 16 is forced downward toward the plane of the lower edges 25, 26 of the ring 13, and since the width of the flanges 14 and 15 is greater than the width of the expansion rings 21 and 22, the expanded packing which is shown in dotted lines and indicated by the numeral 13a is fed edgewise beyond the outer edges 27—30 of the expansion rings.

The concavely curved surface 23 and convexly curved surface 24 of the expansion members is preferably such that the expanded packing is brought into engagement with substantially the full area of the surfaces 23 and 24 when the packing is fully expanded, and thus the inner surfaces 31 and 32 of the upper expansion member are adapted to reinforce and support the leather rings when fully expanded, and prevent the rings from slithering back and forth where the packing is employed in a reciprocating member.

Figure 1:
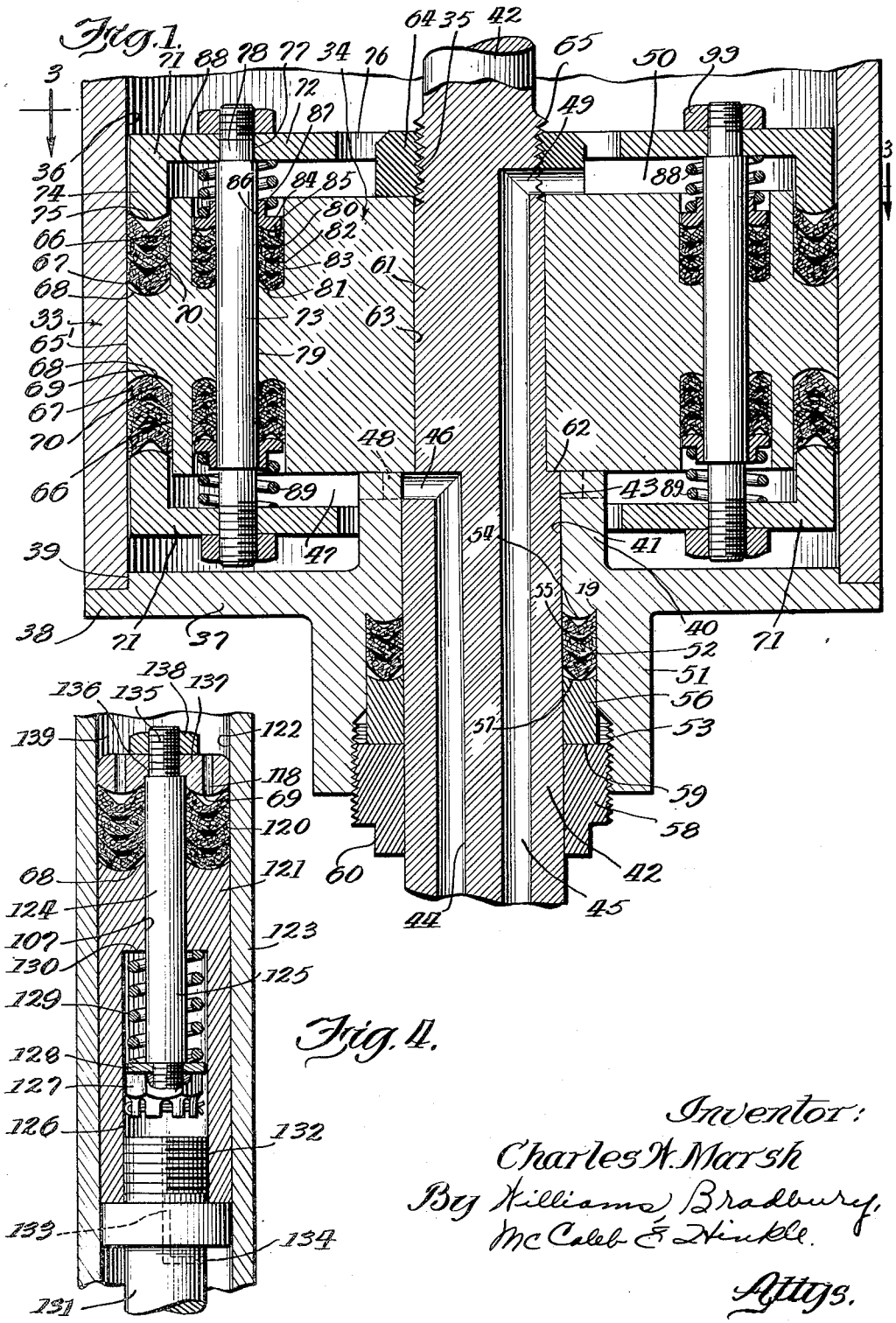
Fig. 1 is a sectional view of a cylinder and piston, taken on a plane passing through the axis of the cylinder and piston.

Referring to Fig. 1, this is a longitudinal sectional view taken on a plane passing through the axis of the cylinder 33, piston 34 and piston rod 42. The piston of the type shown in Fig. 1 is peculiarly adapted to be used for devices such as air chucks, where it is necessary to provide a piston that will maintain a high pressure continuously without leakage, even though the piston is motionless with respect to the cylinder. A leakage past the piston 34 in the case of an air chuck would result in the gradual release of the work grasped by the chuck and would render the air chuck practically useless.

The cylinder 33 may take a number of different forms, but preferably consists of a substantially cylindrical member having an inner surface 36 which is accurately machined and ground to substantially cylindrical form. The present cylinder is preferably provided with a cylinder head 37 having a radially extending flange 38 adapted to engage the end of the cylinder 33 and having an annular shoulder 39 engaging inside the cylinder 33 to definitely determine the central location of the cylinder head 37.

The piston 34 in Fig. 1 may be a double acting piston, and since both ends of the cylinder may be substantially the same in construction, it is only necessary to describe one end. Thus, the cylinder head 37 is preferably provided with an inwardly projecting annular flange 40 having an axially located circular bore 41 for slidably receiving the piston rod 42. The piston rod 42 is provided with an external cylindrical surface 43 fitting in the bore 41 and with a pair of conduits 44 and 45 communicating with the opposite ends of the piston 34.

The conduit 44 extends longitudinally of the piston rod 42 and transversely at 46 to communicate with the interior of the cylinder 33 at the point 47, the flange 40 being provided with a groove 48 adapted to register with the conduit 46.

The conduit 45 likewise extends longitudinally of the piston rod 42 to a point adjacent the other side of piston 34 where conduit 45 has a transversely extending portion 49 which communicates with the space 50 on the other side of piston 34.

The cylinder head 37 is also preferably provided with an outwardly extending tubular member 51 having a counterbore 52 and an enlarged threaded bore 53. The inner end of counterbore 52 is formed with a convexly curved surface 54 which is similarly shaped to the convex surface 24 of Fig. 8, and adapted to serve as the inner expansion member for a plurality of expansion rings 55. The counterbore 52 may be provided with any number of expansion rings of the type previously described, each adapted to nest with each other and adapted to be expanded and fed edgewise into engagement with the outer cylindrical wall of the counterbore 52, and with the cylindrical surface 43 of piston rod 42. This expansion is effected by the convexly curved surface 54 and by an expansion member 56 comprising a metallic ring adapted to slidably engage about the piston rod 42 and to fit in the counterbore 52. The expansion ring 56 also has a concavely curved surface 57 similar in shape to the concave surface 23 described with respect to Figs. 8 and 9.

The threaded bore 53 is provided with a complementary threaded member or gland 58 which preferably has a flat surface 59 at one end for engaging expansion ring 56 and a non-circular portion 60 adjacent the other end for engagement with a wrench or other tool.

It will be evident that the packings 55 may be expanded edgewise into engagement with the piston rod as previously explained, and this provides a liquid and gas-tight joint about the reciprocating piston rod 42, the sealing action of the packings 55 being augmented by pressure within the space 47 below the piston 34. Any pressure in the lower end of the cylinder 33 acts upon the relatively sharp lips 19 of the packings 55 and forces the packings 55 into closer engagement with the piston rod 42 and wall 52. Any leakage past the first of a series of packings 55 produces a similar action upon the next packing ring and the assembly illustrated is very effective in maintaining a high pressure without leakage for a long period of time.

The piston rod 42 is preferably provided with a reduced cylindrical portion 61 forming an annular shoulder 62 against which the piston 34 engages and the reduced cylindrical portion 61 is adapted to be received in a bore 63 formed in the body of piston 34. Piston 34 may be secured on piston rod 42 by a nut 64 adapted to be threaded on the threaded end 65 of piston rod 42, and if desired, the bore 63 and surface 61 of piston and piston rod, respectively, may be tapered to provide a fluid-tight joint between these parts. The connection between the piston rod and piston should be a close fluid-tight joint in any event to prevent leakage at this point.

The piston 34 preferably comprises a substantially cylindrical metallic member formed of the best tool steel or of material having a minimum coefficient of expansion with temperature if the piston is to be subjected to heat. The piston 34 has an external cylindrical surface 65' which is adapted to slidably engage the internal cylindrical surface 36 of cylinder 33.

In the case of a double acting piston, the piston 34 is provided with a cylindrical surface 66 at each end of reduced diameter, thereby forming an annular space 67 between the piston 34 and the wall of cylinder 33. The annular space 67 at each end of the piston 34 is terminated by the concave annular surface 68 similar in form to the concave surface 23 of Fig. 8, and adapted to engage the apex 69 of the adjacent leather V-packing. A plurality of leather V-packings 70 of any of the forms previously described are placed in the annular spaces 67 about the piston 34, and each series of packings is subjected to the action of an expansion member 71 of similar structure at each end of the piston.

Each expansion member 71 comprises an annular metal member having a radially extending flange 72 adapted to be mounted on a plurality of plungers 73 and having an axially extending tubular flange 74, the end of which is formed with a convex expansion surface 75. The expansion surface 75 is similar in form and function to the expansion surface 24 described with respect to Figs. 8 and 9.

The expansion ring 71 is provided with a centrally located aperture 76 providing a clearance between the expansion ring and the nut 64, and with a plurality of apertures 77 symmetrically located in the radial flange 72 and adapted to receive the reduced ends 78 of plunger 73.

Figure 3:
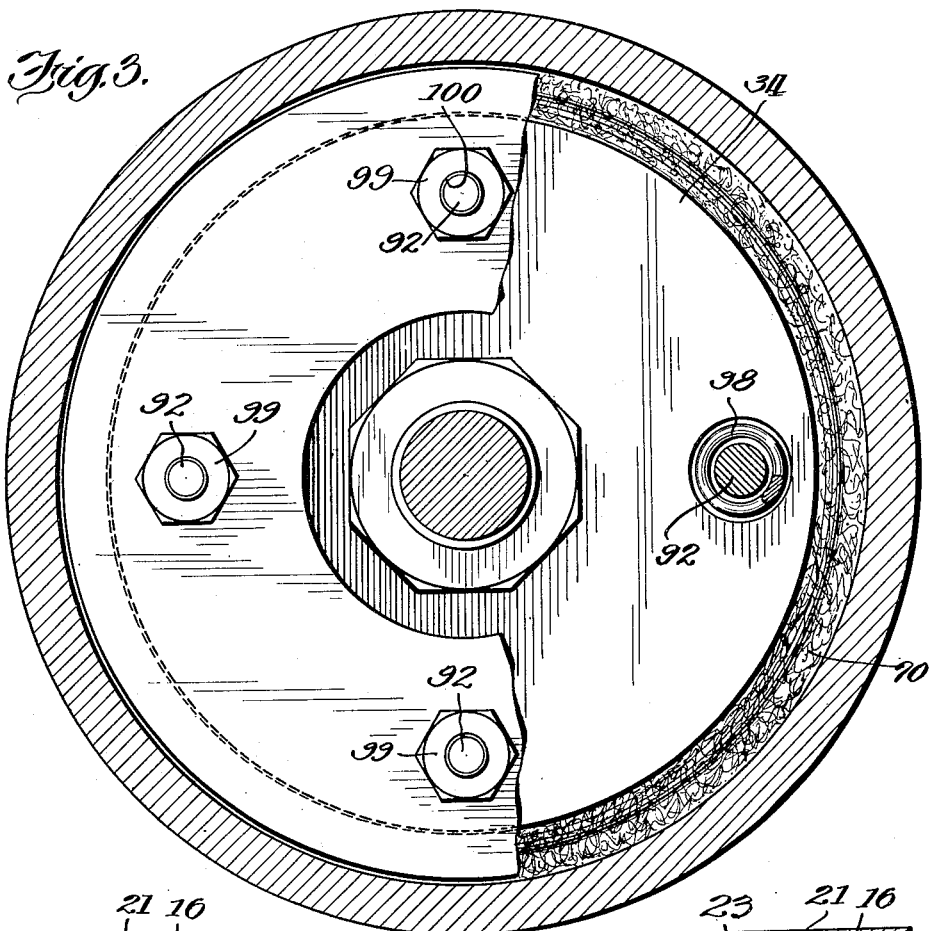
Fig. 3 is a transverse sectional view taken on the plane of the line 3—3 of Fig. 1, looking in the direction of the arrows.

The body of piston 34 is preferably provided with a plurality of longitudinally extending bores 79, one for each plunger 73, and the plungers 73 are preferably spaced equally from each other and located at equal radii from the axis of the piston. Any number of plungers may be employed, preferably more than two, so as to positively prevent any tilting or binding of the expansion ring 71 and plunger 73, but in the embodiment illustrated in Figs. 1 and 3, four plungers are used.

Each of the bores 79 is provided with an enlarged counter-bore 80, terminating in the annular shoulder 81 which comprises a concavely curved surface similar in form and function to the concave surface 23 of Fig. 8. The concave annular surface 81 constitutes an expansion member for engaging the apex 82 of one of the series of expansion rings 83 located in the counterbore 80 about plunger 73. Above the expansion rings 83 in counterbore 80, there is located a metallic expansion member 84 comprising an annular member having the convex expansion surface 85 similar in form to the convex surface 24 of Fig. 8, and adapted to initially engage the inner outside edges of the uppermost V-shaped expansion rings 83.

The expansion ring 84 has an axially located bore 86 and a tubular flange 87 serving to align and space the compression spring 88 with respect to the plungers 73. The compression spring 88 comprises a helical spring seating at one end upon the flat surface of expansion ring 84 and at the other end against the lower side of expansion ring 72.

The arrangement at each end of the plunger 73 is identical and the arrangement of each plunger identical with respect to the others, so that it is unnecessary to describe the other plungers in detail. The spring 89 at the lower end of plungers 73 may be identical in construction with the spring 88 and the operation of the present piston may be described in brief, as follows.

The expansion rings 83 about the plungers 73 act in the manner described with respect to Figs. 8 and 9, and it will be observed that the packing rings 83 in the upper end of plungers 73 have their flanges extending upward. The expansion rings are thus adapted to be forced into closer engagement with the plungers 73 and walls of counterbore 80 by fluid pressure on the upper side of the piston.

Likewise the lower expansion rings about plungers 73 are forced into closer engagement with the plunger by pressure on the lower side of the piston 34. Each of the springs 88 produce an initial pressure and expanding action upon the rings 83 about plungers 73, by means of the combined action of the expanding ring 84 and surface 81 toward which the expanding ring 84 is forced by spring 88. Each of the springs 88 is thus compressed and reacts against the other spring.

The location of the expansion ring 71 with respect to the outer packings 70 is such that these packings are initially expanded into engagement with the wall 36 of cylinder 33, but as soon as fluid pressure is produced on one side of the cylinder, the pressure acts upon the plungers 73 and automatically increases the expanding action of the large expanding ring 71. The effective area upon which this pressure may act is the combined cross-sectional area of the plungers 73 and since the plungers 73 are resiliently mounted with respect to the piston 34, any increase in pressure on either side of the piston automatically causes an additional expansion of the series of packings 70, which are adapted to resist leakage of such pressure, thereby compensating for the increased pressure by means of an increased resistance towards leakage.

Thus, a pressure on the upper side of the cylinder will cause the upper expansion ring 71 to move downward, expanding the upper packings 70 into closer engagement with the walls of the cylinder, but releasing the lower packings 70 to permit them to idle as the piston moves upward. The action on the other side of the cylinder is substantially the same, and it should be noted that whenever increased pressure causes increased expansion of the large packing, the compression of the spring 88 is also increased, tending to increase the effectiveness of the packing about the plungers 73.

The expansion effected with respect to the packings of piston 34 does not consist of the mere expansion of the upper edge of the uppermost ring, but due to the nesting of the packing rings and the structure and arrangement of the expanding devices, the leather packing rings are uniformly fed in an edgewise direction into engagement with the reciprocating parts, thereby providing a sealing surface consisting of a multiplicity of laminæ and any number of packing rings may be employed, depending on the results desired. The number of rings illustrated has been found sufficient for practical purposes.

Figure 2:
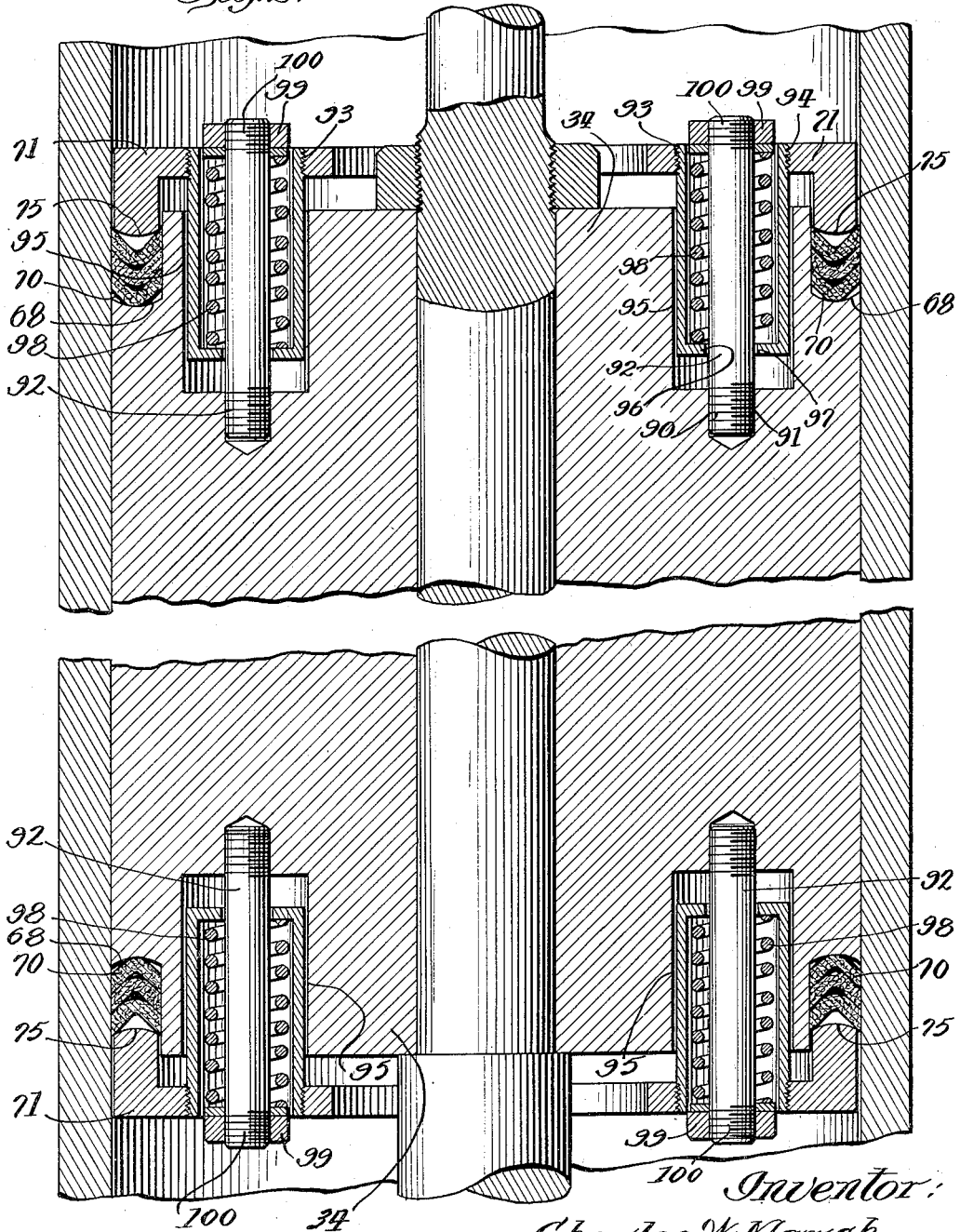
Fig. 2 is a similar view of another modified form of piston.

In the embodiment of Fig. 2, the construction of the piston 34 with respect to the outer and larger packing rings 70 and their expansion devices, is substantially the same, but the bolts which provide a support for permitting the reciprocation of the expansion ring 71, do not pass all the way through the body of the piston 34. In this embodiment the piston is provided with a plurality of symmetrically located, longitudinally extending threaded bores 90, each of which is adapted to receive the threaded end 91 of a stud bolt 92. The expansion ring 71 which is otherwise similar in structure to the large expansion ring of Fig. 1, is provided with a plurality of threaded bores 93 into each of which there is threaded a metal tube 94. The metal tube 94 extends into a counterbore 95 and is provided with a radial flange 96 at its inner end having a bore 97 adapted to slidably engage the bolt 92.

A compression spring 98 is compressed between the flange 96 and the nut 99 carried by the other threaded end 100 of bolt 92. The compression springs 98 on the bolts 92, which are symmetrically located about the piston, thus tend to urge the expansion rings 70 toward the body of the piston 34 to effect expansion of the packings 70 between the convex surface 75 and concave surface 68.

In this modification, the compression springs 98 maintain the packing rings 70 under substantially constant pressure tending to feed the packings edgewise into engagement with the walls of the cylinder.

Referring to Fig. 5, this is a modified form of piston which is adapted to be used as a pump plunger or ram. This single acting piston 101 is mounted in a cylinder 102 and provided with outer packings 70 which are supported in substantially the same way as the outer packings previously described. Due to the higher pressures encountered, a greater number of packings are nested together about the reduced cylindrical surface 66 of piston 101 between the concave annular surface 68 and convex annular surface 69. The movable expansion member 103 is similar in form to expansion member 71 previously described, with respect to Fig. 1, except that the expansion member 103 is carried by a single plunger 104.

The plunger 104 is packed with packing rings 83 similar in form to those previously described and the packing rings 83 are confined between the concave annular surface 81 and the convex annular surface 85 on expansion ring 84. Spring 105 is tensioned between the large expansion ring 103 and the small expansion ring 84, and a nut 106 retains the large expansion ring 103 on plunger 104. The opposite end of plunger 104 extends through bore 107 in piston 101, and is provided with a nut or head 108 and washer 109. The helical spring 110 of greater strength than the spring 105, is compressed between the base 111 of counterbore 112 and washer 109, tending to urge the large expansion ring 103 into initial engagement with the packing 70.

The spring 110 being stronger than spring 105, the spring 105 is also maintained under compression by spring 110, placing an initial pressure on the packings 83. This initial pressure in each case is sufficient to maintain the packings in initial engagement with the walls of chambers in which they are located, but it permits the idling of the piston without unnecessary friction.

The nut 108 on plunger 104 is located in a chamber 113 formed in the lower end of the piston 101 and the chamber 113 may be provided with threads 114 for receiving the threaded end 115 of the piston rod 116.

In order to permit the pressure of the fluid in the upper end 117 of the cylinder 102 to act on the packings 70 and 83, the large expansion ring 103 is provided with a multiplicity of axially extending apertures 118 providing communication between the chamber 117 and the vicinity of the packings 70, 83. The pressure in the space 117 of the cylinder thus tends to expand the packings into closer engagement with the walls of the cylinder, and is particularly effective with respect to the sharp edges 19 of the packings, which may be forced out by such pressure. Any leakage past the uppermost of the series of packings likewise tends to act on the other packings, tending to expand their sharp beveled edges into engagement with the walls of the cylinder, and it will thus be observed that the packings are most effectively arranged to be expanded edgewise by the pressure which they create.

The packing rings in any one of the devices described herein may consist of alternate rings of felt and leather of the same shape, or occasional felt rings, the felt rings being impregnated with oil or solid grease and adapted to continuously lubricate the packed joint.

When the piston 101 is actuated upward in Fig. 5, an increased pressure in the space 117 not only causes the packings themselves to expand by virtue of the action of the fluid pressure on the packings, but the increased pressure on the plunger 104 forces the plunger 104 downward against the pressure of spring 105, aiding spring 110 and augmenting the expanding and sealing action of the entire series of packings. An increase in pressure in the cylinder thus increases the sealing action of all of the packings, not only at the outer surface of the cylinder, but about the resiliently mounted plunger 104. When the ram is not performing work, however, it may idle without excessive action or pressure on the packings, thereby reducing the wear and amount of work performed in idling.

In the case of a single acting piston, the presence of a small amount of leakage past the packings 83 about plunger 104 in bore 107 might eventually cause a pressure to build up in the chamber 113, thereby destroying that differential of pressure which should exist between the fluid in the space 117 at the upper end of plunger 104 and the space 113 below plunger 104. It is this differential in pressure which permits the compensating action of the present piston, and I therefore prefer to provide the chamber 113 with an outlet conduit 119, leading to the wall of the piston adjacent its lower end, or extending out of the lower end, if desired.

Referring to Fig. 4, this is a modified form of ram similar to Fig. 5, in which a single series of packings 120 is arranged to effect the sealing action between the piston 121 and inner wall 122 of cylinder 123, as well as the sealing action with respect to the plunger 124. In this case the concave annular surface 68 forms the upper end of piston 121, which is provided with a bore 107 for a plunger 125.

The plunger 125 has its lower end located in a counterbore 126 and provided with a nut 127 and washer 128. A helical spring 129 is tensioned between the washer 128 and the end 130 of counterbore 126, and the piston rod 131 which is provided with a threaded end 132 threaded into the counterbore 126, has a bleeder outlet 133 which communicates with the atmosphere at 134. The upper end of plunger 124 is provided with a reduced threaded portion 135 forming an annular shoulder 136 against which there is secured an expansion ring 137 by means of nut 138.

The expansion ring 137 is provided with the annular convex surface 69 similar to those already described and with the apertures 118 previously described for admitting pressure to the vicinity of the packings 120. In this embodiment, the increased pressure in the chamber 139 above the piston 121 also acts on the plunger 124, tending to increase the expanding action of the expansion ring 137 upon increase in pressure inside the cylinder chamber 139. The same packings which engage the inside wall 122 of their cylinder have their inner edges engaging the cylindrical surface of plunger 124 to prevent leakage of fluid past the resiliently mounted plunger 124. The spring 129 maintains the packings under initial pressure so as to render them immediately effective upon motion of the piston 121.

Referring to Fig 6, this is a modified form of compensating piston in which the outer packings of the piston are of a different character. The body of the piston 140 comprises a substantially cylindrical member having a threaded surface 141 and having radially extending flange 142 provided with circular ribs 143 which may be of substantially V-shape.

The packing may consist of a cup-shaped leather member 144 of the best leather, having a beveled upper edge 145 and having a radially extending flange 146. The radially extending flange 146 of the packing 144 is clamped between the radial flange 142 and an annular clamping ring 147, which is likewise provided with circular ridges 148. The ridges 143 and 148 are staggered with respect to each other, and when the leather flange 146 is securely clamped between the members 142 and 147 by the nut 149, the inner edge of the packing 144 is fixedly secured to the piston 140 without any possibility of leakage at the point of securement.

The piston 140 is provided with an axially extending bore 150 for slidably receiving the plunger 151 and the head 152 of plunger 151 is located in counterbore 153. A heavy compression spring 154 is tensioned between head 152 and base 155 of counterbore 153, and the end of piston rod 156 is threaded on the piston body 140. A bleeder conduit 157 extending from counterbore 153 to the atmosphere, prevents the building up of pressure in the chamber 153.

The upper end of piston 140 is provided with a counterbore 158 similar to those previously described, and filled with leather V packings 159. The expansion ring 160 is similar to those previously described, and a helical coil spring 161 is tensioned between the expansion ring 160 and the large expander 162. The coil spring 161 is of less strength than coil spring 154 and is thus adapted to place an initial pressure on the expanding devices for packings 159, but coil spring 154 urges the expander 162 downward with respect to piston 140. The piston 140 is provided with a radially extending flange 163 adjacent its upper end, forming an annular groove 164 for slidably receiving a multiplicity of segmental expanders 165.

The segmental expanders are trapezoidal in plan as shown in Fig. 7, and are formed with an inwardly extending groove 166 adapted to receive the endless coil spring 167. The segmental expanders 165 have upwardly extending flanges 168 which are provided with cylindrical surfaces 169 and with frusto-conical camming surfaces 170 engaging the inner surface of the cup leather 144.

The coil spring 167 tends to draw all of the segmental expanders 165 in toward the body of the piston 140, but the segmental expanders are provided with a frusto-conical inner surface 171 which is engaged by a complementary frusto-conical surface 172 on the expansion ring 162. The expansion ring 162 is fixedly secured on plunger 151 between annular shoulder 173 and nut 174, and is provided with apertures 175 to insure the admission of fluid pressure to the inside of the cup leather 144.

The cup leather 144 is thus immediately subjected to fluid pressure when the piston 140 moves upward, and it is initially subjected to the expanding action of the segmental expanders 165 by means of the spring 154 which urges piston 140 downward, carrying with it expanding ring 162. The frusto-conical surface or tapered surface 172 on expanding ring 162 engages the beveled surfaces 171 on the respective segmental expanders, forcing them into engagement with the cup leather and effecting a sealing engagement between the outer face of the cup leather and the wall of the cylinder. This sealing engagement is increased by pressure on the upper end of the piston, since such fluid pressure would act on the effective area of the plunger 151 and drive the plunger downward against the action of spring 161.

In some embodiments of my invention, I utilize alternate V-shaped leather washers and flat leather or felt washers, in which case the flat washers have their edges drawn in by the pressure and spaced from the walls, thereby leaving the sharp lips of the V-packings free to do their work best.

This modification is thus also adapted to permit the idling of the piston without excessive wear on the packing, but to effect the compensation of the sealing action automatically, depending upon the pressure in the cylinder. A greater pressure requires a greater sealing action of the packings, and this sealing action is effectively provided by the structure described.

It will thus be observed that I have invented a number of forms of improved pistons which are capable of many different uses, but in which the sealing action of the packings is increased by the pressure in the cylinder in which the piston is mounted. The pressure not only effects an expansion of the packings at the outer surface of the piston, but of the packings surrounding the resiliently mounted plunger, and the present pistons are capable of maintaining high pressures without leakage for long periods of time without any necessity for repacking the piston.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. A piston comprising a body having a substantially cylindrical outer surface, one end of said body being reduced in size and formed with an annular shoulder, said shoulder being concavely formed to provide an expansion surface, with a plurality of layers of substantially V-shaped leather packings about said reduced end, and having the apex of the end packing engaging said concave surface, an expander, comprising an annular member having a convex annular surface for initially engaging the inside of the flanges of the end V packing, a plunger for slidably supporting said expander, a spring for maintaining said expander in initial engagement with said packings, said piston being formed with a counterbore about said plunger, a similar packing in said counterbore, and a spring tensioned between said latter packing and said expander.

2. A piston comprising a body having a substantially cylindrical outer surface, one end of said body being reduced in size and formed with an annular shoulder, said shoulder being concavely formed to provide an expansion surface, with a plurality of layers of substantially V-shaped leather packings about said reduced end, and having the apex of the end packing engaging said concave surface, an expander, comprising an annular member having a convex annular surface for initially engaging the inside of the flanges of the end V packing, a plunger for slidably supporting said expander, a spring for maintaining said expander in initial engagement with said packings, said piston being formed with a counterbore about said plunger, a similar packing in said counterbore, and a spring tensioned between said latter packing and said expander, said first-mentioned spring being stronger than the latter spring, and adapted to counteract the latter spring and initially expand the piston packings.

3. A double-acting piston comprising a cylindrical body, oppositely facing V-shaped leather packings carried by said body for engaging the walls of a cylinder, an expander on each end of said piston for engaging and expanding said packings, means extending through said piston and supporting said expanders whereby increased fluid pressure in the cylinder acts on said means to increase the expanding action of the corresponding packing, said means comprising a plurality of symmetrically located plungers, similar V packings about each end of each plunger, and springs tensioned between the expanders and the latter V packings.

4. In a piston, the combination of a piston having a substantially cylindrical body, with a reduced cylindrical portion providing an annular space between said portion, and a cylinder for a packing, an expander shoulder located between said reduced portion and the main body of said piston, a plurality of substantially V-shaped leather packing turns, each comprising a pair of frusto-conical flanges joined together along the line of a circle, and said turns nesting in each other to form a stack of expansible turns, said flanges having beveled edges so that the assembly of nested packing flanges forms a substantially cylindrical bore for engaging said reduced part of said piston, and a substantially cylindrical outer surface at the outer edges of said packing for engaging the walls of a cylinder, said expander shoulder being concavely curved and of less depth than the external altitude of said V-shaped packing flanges, whereby said expander shoulder initially engages the apex, an expander adapted to engage the inside of the flanges of the opposite end packing adjacent the edges of the flanges, whereby said packings are expanded edgewise, and means for movably supporting said expander on said piston, comprising a member passing from the pressure side of said piston to a point of lesser pressure, and said packings having their flanges directed toward the pressure side of said piston, whereby said expander and said packings are subjected to increased expanding action by increased pressure on the pressure side of said piston.

5. In a piston, the combination of a supporting body formed with a substantially concave annular supporting surface, with a plurality of substantially V-shaped leather packings nested together and supported by said supporting surface, the outer edges of said V-shaped packings forming a cylindrical surface, an expanding member mounted to engage inside the end packing and to expand the V-shaped packings edgewise, and a substantially V-shaped lubricant carrying member mounted between said packings and adapted to feed lubricant at the edges of said packings, said lubricant carrying member feeding the lubricant in greater amount, depending upon the pressure exerted upon said packings.

6. In a piston, the combination of a supporting body formed with a substantially concave annular supporting surface, with a plurality of substantially V-shaped leather packings nested together and supported by said supporting surface, the outer edges of said V-shaped packings forming a cylindrical surface, an expanding member mounted to engage inside the end packing and to expand the V-shaped packings edgewise, and a substantially V-shaped lubricant carrying member mounted between said packings and adapted to feed lubricant at the edges of said packings, said lubricant carrying member feeding the lubricant in greater amount, depending upon the pressure exerted upon said packings, said V-shaped leather packings being formed with sharp beveled edges, and similar lubricant distributing members of compressible characteristics located between each of the leather packings to yieldingly mount said sharp edges and cause them to move into closer engagement with the walls of the cylinder upon increased pressure in the cylinder.

7. In a piston, the combination of a supporting body formed with a substantially concave annular supporting surface, with a plurality of substantially V-shaped leather packings nested together and supported by said supporting surface, the outer edges of said V-shaped packings forming a cylindrical surface, an expanding member mounted to engage inside the end packing and to expand the V-shaped packings edgewise, said piston having a plunger extending through the same, means for packing said plunger and said plunger supporting said expansion member, the area of said plunger being subjected to the pressure and said packings being expanded under greater expander pressure responsive to an increase of pressure.

8. In a piston, the combination of a supporting body formed with a substantially concave annular supporting surface, with a plurality of substantially V-shaped leather packings nested together and supported by said supporting surface, the outer edges of said V-shaped packings forming a cylindrical surface, an expanding member mounted to engage inside the end packing and to expand the V-shaped packings edgewise, said piston having a plunger extending through the same, and said plunger supporting said expansion member, the area of said plunger being subjected to the pressure and said packings being expanded under greater expander pressure responsive to an increase of pressure, and packing means for resisting a differential of pressure between one side of the expander plunger and the other side.

CHARLES W. MARSH.